United States Patent
Nyarko et al.

(10) Patent No.: US 9,973,275 B2
(45) Date of Patent: May 15, 2018

(54) SYSTEM AND METHOD FOR LIGHTING AND BUILDING OCCUPANT TRACKING

(71) Applicant: Morgan State University, Baltimore, MD (US)

(72) Inventors: Kofi Nyarko, Essex, MD (US); Christian Emiyah, Baltimore, MD (US); Samuel Mbugua, Baltimore, MD (US)

(73) Assignee: Morgan State University, Baltimore, MD (US)

( * ) Notice: Subject to any disclaimer, the term of this patent is extended or adjusted under 35 U.S.C. 154(b) by 0 days. days.

(21) Appl. No.: 15/430,904

(22) Filed: Feb. 13, 2017

(65) Prior Publication Data

US 2017/0237487 A1    Aug. 17, 2017

Related U.S. Application Data

(60) Provisional application No. 62/293,867, filed on Feb. 11, 2016.

(51) Int. Cl.
| | |
|---|---|
| *H04B 10/116* | (2013.01) |
| *H04J 14/08* | (2006.01) |
| *H04W 64/00* | (2009.01) |
| *G01S 1/70* | (2006.01) |
| *H04W 4/04* | (2009.01) |

(52) U.S. Cl.
CPC .............. *H04B 10/116* (2013.01); *G01S 1/70* (2013.01); *H04J 14/086* (2013.01); *H04W 4/04* (2013.01); *H04W 64/00* (2013.01)

(58) Field of Classification Search
CPC ...... H04B 10/114–10/116; G01S 1/70; H04W 64/00; H04J 14/08–14/086
See application file for complete search history.

(56) References Cited

U.S. PATENT DOCUMENTS

| | | | | |
|---|---|---|---|---|
| 2003/0151600 | A1* | 8/2003 | Takeuchi | G06F 1/1626 345/204 |
| 2006/0072919 | A1* | 4/2006 | Edelist | H04B 10/1149 398/135 |
| 2014/0280316 | A1* | 9/2014 | Ganick | G06F 17/30522 707/769 |
| 2014/0341588 | A1* | 11/2014 | Pederson | H04B 10/40 398/128 |
| 2015/0023023 | A1* | 1/2015 | Livesay | H01L 33/642 362/294 |
| 2015/0042240 | A1* | 2/2015 | Aggarwal | H04L 12/2803 315/292 |
| 2016/0352424 | A1* | 12/2016 | Kido | H04B 10/116 |

* cited by examiner

*Primary Examiner* — David Payne
*Assistant Examiner* — Casey Kretzer
(74) *Attorney, Agent, or Firm* — Whiteford, Taylor & Preston, LLP; Gregory M. Stone

(57) ABSTRACT

Disclosed is a system and method for using visible light communication ("VLC") to perform indoor position location. Through use of a system and method configured as set forth herein, the position of any appropriately marked person or item may be found indoors using data interconnected modules that communicate with one another via RF and visible light. A mobile receiver in the form of a tag or badge attached to the person or item to be tracked receives a VLC signal from a plurality of lighting modules, and transmits back to a processor the data it received so that the processor is able determine the tag's or badge's physical position with respect to the individual network modules.

19 Claims, 4 Drawing Sheets

SYSTEM AND METHOD FOR LIGHTING AND BUILDING OCCUPANT TRACKING

CROSS REFERENCE TO RELATED APPLICATION

This application is based upon and claims benefit of copending U.S. Provisional Patent Application Ser. No. 62/293,867 entitled "Building Occupant Lighting and Tracking System," filed with the U.S. Patent and Trademark Office on Feb. 11, 2016 by the inventors herein, the specification of which is incorporated herein by reference in its entirety.

GOVERNMENT RIGHTS

This invention was made with government support under Grant No. EEC-0812056 awarded by the National Science Foundation. The government may have certain rights in the invention.

FIELD OF THE INVENTION

This invention relates generally to indoor positioning systems, and more particularly to systems and methods for indoor position detection and tracking using visible light communication.

BACKGROUND OF THE INVENTION

The installation of "Smart Building" technologies is rapidly becoming the norm in both new construction and in modernization of legacy buildings. It has been estimated that in the United States alone, $289 billion worth of building efficiency investment would produce savings in excess of $1 trillion in operating expenses. Every dollar invested in these Smart Building technologies returns $3 in savings. The savings are primarily in energy (climate control), electricity usage (lighting) and water usage. Layered on top of this is the need in many buildings for enhanced security and safety systems, which systems may add significant expense.

Various companies have been working on providing Indoor Position System ("IPS") solutions for the past two decades with varying degrees of accuracy, cost and reliability. Some companies, such as Ekahau and AeroScout, use active Radio Frequency Identification (RFID) tags that occupants wear to determine when an occupant passes a RFID reader (receiver). The accuracy of this approach is limited to the number of receivers available through the building, which is often cost limited. For secure environments where radio frequency emissions are restricted to prevent unauthorized information access and possibly data manipulation, RFID approaches are not practical. Other companies, such as Meridian and Accuware, rely on the use of mobile phones for IPS. There are several ways that this can be accomplished, such as the use of WiFi access points and Bluetooth technology, both of which falls under the class of Distributed Antenna Systems (DAS) that involves the measurement of signal strength or power levels of radio signals to calculate distance from anchor objects. Lately, companies such as Apple, Google, and Awarepoint are popularizing a particular approach called Bluetooth Beaconing, which utilizes the Bluetooth Low Energy standard. The density and quantity of Bluetooth beacons and WiFi access points is critical to the accuracy of this approach, and as such serves as its major limitation. Other non-RF based techniques, such as passive infrared and acoustic occupancy sensing are also available on the market, but these approaches are only suitable for zone/room occupancy detection and not the fidelity and discrimination required for occupant tracking. Companies such as GeoVision use computer vision techniques to detect occupants through surveillance feeds at key points within the building. However, this approach can be among the most expensive, costing over 3 times that of competing solutions. Another company, Savi Technology, employs frequency shift keying (FSK), and their technology is primarily used for asset tracking within the DoD.

SUMMARY OF THE INVENTION

Disclosed is a system and method for using visible light communication ("VLC") to perform indoor position location. Through use of a system and method configured as set forth herein, the position of any appropriately marked person or item may be found indoors using data interconnected modules that communicate with one another via RF and visible light. A mobile receiver in the form of a tag or badge attached to the person or item to be tracked receives a VLC signal from a plurality of lighting modules, and transmits back to a processor the data it received so that the processor is able determine the tag's or badge's physical position with respect to the individual network modules.

The system and method set forth herein use VLC to accomplish IPS at little more than the cost of traditional LED lighting retrofit or installation. This technology is well suited for secure environments, in which RF leakage cannot be tolerated.

The system and method set forth herein perform comprehensive building occupant tracking using lighting modules. The technology involves the use of a Light Emitting Diode (LED) lighting module designed to be interconnected with other lighting modules for the purpose of both energy efficient illumination and indoor occupant tracking when combined with a tag carried by each individual or item being tracked. Each module is comprised of a bank of high lumen VLC LEDs that serve two purposes: namely, (1) provide illumination, and (2) communicate with the remote tag. In addition, each module has an inter-module communication device, such as a pair of infrared (IR) LED diodes and photo detectors on each face, enabling each module to communicate with a neighboring module, forming a mesh. The system is configured to serially transmit unique identification codes from the network of lighting modules using time division multiplexing (TDM), which is considerably less costly to implement than previously known indoor positioning systems, using low cost LED's while enabling high density distribution to improve accuracy. The tag carried by each occupant detects the unique IDs of a plurality of transmitting modules, which data may be used to calculate its relative position. This information is transmitted to a processor, which accurately determines the position of the tag in the building.

While a thriving market exists for technologies designed to save energy and cost for building owners, not enough of these technologies have a low installation cost and are self-commissioning. The system and method set forth herein may allow traditional lighting manufactures and building retrofitters to provide a self-commissioning and scalable solution for indoor positioning with little additional cost to a traditional lighting retrofit or new installation, in entire buildings or areas with special needs. The system and method set forth herein may also provide up to an additional 25% energy savings by automatically controlling lights and other energy consuming infrastructure (e.g., HVAC systems, office appliances, etc.) based on occupant presence. Moreover, the system and method set forth herein provides greater security than previously known indoor positioning systems due to the use of VLC, and offers increased tracking fidelity across an entire structure (not just per zone) with lower cost, while still preserving occupant privacy (i.e., no vision systems).

Large commercial, private and government buildings stand to benefit from Smart Buildings technologies, in which sensor data enable various aspects of the building to adjust energy use based on local occupant behavior. Commercial buildings alone account for about 20% of the entire U.S. energy consumption. However, the technologies to enable building-wide readings of occupant behavior are expensive to implement, not to mention expensive and complicated to calibrate and maintain. Besides energy reduction, certain private and government buildings require secure solutions to tracking occupants throughout the entire structure for security reasons. Some of the use cases why companies would want to adopt an IPS as part of a lighting solution as described herein include increased efficiency related to real-time progress updates, ensuring compliance with governmental regulations such as ensuring required breaks are being observed for workers, ensuring that their internal policies are being followed and that manually recorded worker timesheets are accurate without the privacy concerns associated with comprehensive video/audio surveillance. For hospitals, the ability to determine patient flow and staff locations can help streamline staffing, improve process automation, and eliminate operational bottlenecks, in addition to reducing legal costs associated with ensuring admitted patients are only where they should be, especially in high-risk areas. Furthermore, the Federal Communications Commission is actively interested in IPS to enhance emergency response. Additional uses for systems and methods employed as set forth herein in retail spaces include location aware advertising and customer engagement.

In accordance with certain aspects of an embodiment of the invention, a system is provided for detecting a location of a mobile receiver in an indoor location, comprising a plurality of lighting modules, each having a light source configured to provide visible light communication data signals to a mobile receiver, wherein the plurality of lighting modules are in data communication with one another so as to serially transmit unique identification codes from the plurality of lighting modules using time division multiplexing; a mobile receiver having a photodetector and a transmitter, and computer code configured to determine a module identification code from a visible light signal transmitted from the plurality of lighting modules, and to transmit data representative of determined module identification codes to a processor; and a processor in data communication with the mobile receiver, the processor having computer executable code stored thereon configured to receive the data representative of determined module identification codes, and to determine a physical location of the mobile receiver based on the data representative of determined module identification codes and data representative of a physical location of the plurality of lighting modules.

In accordance with further aspects of an embodiment of the invention, a method is provided for detecting a location of a mobile receiver in an indoor location, comprising the steps of: providing a plurality of lighting modules, each having a light source configured to provide visible light communication data signals to a mobile receiver, wherein the plurality of lighting modules are in data communication with one another so as to serially transmit unique identification codes from the plurality of lighting modules using time division multiplexing; providing a mobile receiver having a photodetector and a transmitter, and computer code configured to determine a module identification code from a visible light signal transmitted from the plurality of lighting modules, and to transmit data representative of determined module identification codes to a processor; providing a processor in data communication with the mobile receiver, the processor having computer executable code stored thereon configured to receive the data representative of determined module identification codes, and to determine a physical location of the mobile receiver based on the data representative of determined module identification codes and data representative of a physical location of the plurality of lighting modules; serially transmitting visible light communication data signals from the plurality of modules; receiving at the processor data transmissions from the mobile receiver comprising lighting module identification codes received by the mobile receiver from the lighting modules; and determining at the processor a physical location of the mobile receiver.

In accordance with still further aspects of an embodiment of the invention, a method is provided for detecting a location of a mobile receiver in an indoor location, comprising the steps of: providing a plurality of lighting modules, each having a light source configured to provide visible light communication data signals to a mobile receiver, wherein the plurality of lighting modules are in data communication with one another so as to serially transmit unique identification codes from the plurality of lighting modules to a mobile receiver using time division multiplexing; providing a processor configured for data communication with the mobile receiver, the processor having computer executable code stored thereon configured to receive from the mobile receiver data representative of module identification codes received by the mobile receiver, and to determine a physical location of the mobile receiver based on the data representative of determined module identification codes and data representative of a physical location of the plurality of lighting modules; serially transmitting visible light communication data signals from the plurality of modules; receiving at the processor data transmissions from the mobile receiver comprising lighting module identification codes received by the mobile receiver from the lighting modules; and determining at the processor a physical location of the mobile receiver.

BRIEF DESCRIPTION OF THE DRAWINGS

The numerous advantages of the present invention may be better understood by those skilled in the art by reference to the accompanying drawings in which.

DETAILED DESCRIPTION OF THE PREFERRED EMBODIMENTS

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Disclosed herein are systems and methods for providing indoor position detection using an array of visible light communication lighting modules that transmit a visible light data signal to a mobile receiver, which mobile receiver then transmits data received from multiple lighting modules to a processor that determines the position of the mobile receiver, and thus of any person or item that is carrying the mobile receiver. Such systems and methods provide for position detection in indoor environments, where GPS or other position location technologies are difficult to implement, and in addition to providing for position detection provide a high efficiency light source for the indoor environment in which the position of persons or items is to be tracked.

Figure 1:
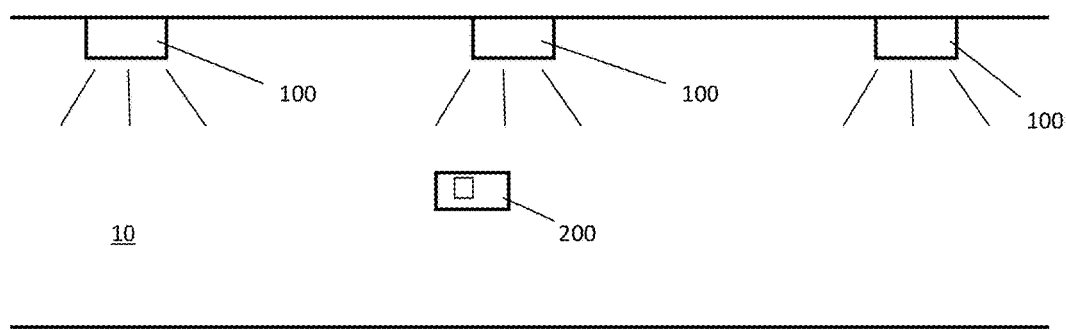
FIG. 1 is a schematic view of an indoor position system in accordance with certain aspects of an embodiment of the invention.

In accordance with certain aspects of an embodiment of the invention and with reference to FIG. 1, an indoor position system includes a plurality of lighting modules 100 that are communicatively interconnected with one another and preferably mounted on the ceiling of a room or hallway 10, with each lighting module having a light source capable of modulating light so as to provide visible light communication (VLC) with a mobile receiver 200. The mobile receiver may, in accordance with further aspects of an embodiment, comprise a portable tag or badge that may be attached to a person, an item of furniture, or anything else that one might wish to track inside of a building or other structure. Each mobile receiver 200 includes a photodetector that receives the visible light communication data signal from multiple lighting modules 100, and a processing device (e.g., a microcontroller) that detects, from the received visible light communication signals, a unique identifier of the lighting modules 100 from which it has received such visible light communication signals. Each mobile receiver 200 also includes a transmitter that transmits such detected unique identifiers to a position processor that processes such data to determine the position of the mobile receiver.

Once determined, the position of such tag may be used to, by way of non-limiting example, determine and track the position of occupants within a building, such as employees, visitors, and the like, or of items of special interest, such as mobile supply cabinets, portable machinery, hospital patient beds, or any other item whose position it may be desirable to track within a building and to which a small tag or badge embodying the mobile receiver may be attached. As discussed in greater detail below, lighting modules 100 are interconnected to form a mesh network communication system enabling individuals and items of interest to be tracked from room-to-room and floor-to-floor in a comprehensive, accurate, and efficient manner.

A system configured in accordance with at least certain aspects of the invention will utilize high-efficiency lighting to implement indoor position tracking for security purposes and for intelligent building operations, in a manner suitable for both new construction and for building retrofits, at little more than the cost of the conventional lighting installation. Such a system may fit a current demand among commercial and government buildings to integrate technologies (in both new construction and retrofit projects) that reduce energy consumption. Given the typically high energy demand of lighting, and the increasing demand in both commercial and government buildings to keep track of building occupants for both security and safety reasons, a system and method implemented in accordance with certain aspects of the invention will enable lighting manufacturers to meet such needs by providing energy efficient lighting options for new construction and retrofits that provide an additional layer of occupant tracking for security, safety, and energy efficiency at little additional cost. Moreover, such systems may be well suited to provide such occupant tracking even in secure environments, in which the risk of leakage of radio frequency data (often used for occupant tracking applications) may be significantly reduced, if not altogether eliminated.

Figure 2:
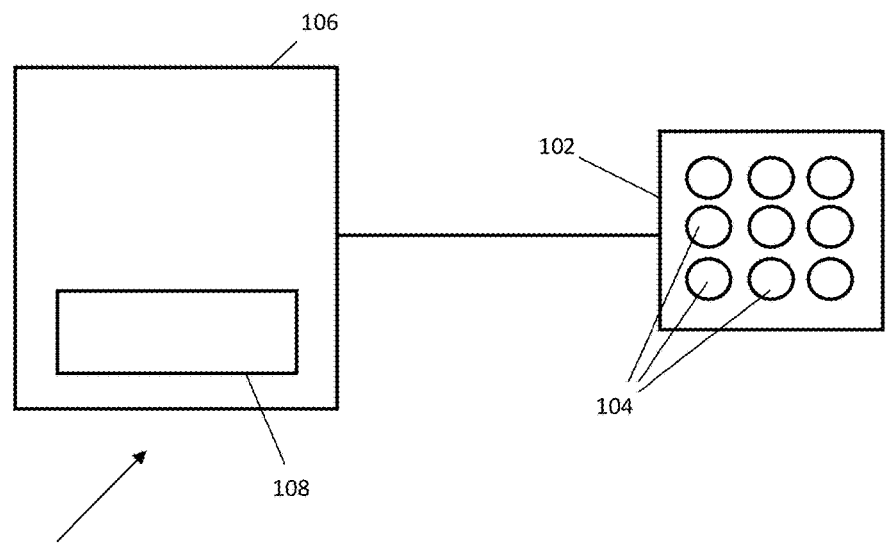
FIG. 2 is a schematic view of a lighting module for use with the system of FIG. 1.

FIG. 2 is a schematic view of a single lighting module 100 in accordance with certain aspects of an embodiment of the invention. Each lighting module 100 includes a bank 102 of high lumen visible light communication light emitting diodes (LED's) 104 that both provide illumination and that communicate via VLC with mobile receiver 200. Each lighting module 100 also includes a controller 106 capable of controlling LED's 104 so as to generate a desired VLC data signal. Controllers capable of generating such control signals to drive VLC LED's are well known to those skilled in the art, and are thus not further detailed here. In addition to having such circuitry as is necessary to generate the desired VLC signal through LED's 104, controller 106 also includes one or more inter-module communication devices 108 configured for communication with adjacent lighting modules 100. Such inter-module communication device 108 may comprise an infrared communication device enabling infrared communication between adjacent lighting modules 100. More particularly, such inter-module communication device 108 may comprise an LED infrared transmitter and detector, such as a pair of infrared LED diodes and photo detectors, positioned on each lighting module 100 so as to provide a line-of-sight to an adjacent lighting module's communication device 108.

Figures 3A, 3B:
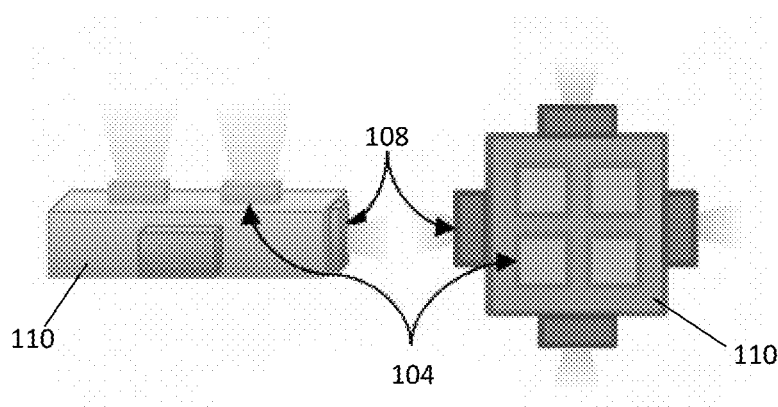
FIG. 3(a) is a side view of a lighting module according to certain aspects of an embodiment of the invention.
FIG. 3(b) is a bottom view of the lighting module of FIG. 3(a).

FIG. 3(a) shows a side view, and FIG. 3(b) a bottom view, of a lighting module 100 in accordance with certain aspects of an embodiment, which lighting module 100 may be suitable for use in new construction. As shown in FIGS. 3(a) and 3(b), controller 106, LED's 104, and multiple inter-module communication devices 108 may be provided on a single housing 110. It is noted, however, that bank 102 of LED's 104 may alternatively be a pre-existing LED lighting fixture, and controller 106 may be provided separately from and in electrical communication with such pre-existing lighting fixture, in those situations in which a facility is to be retrofit to employ systems and methods set forth herein. In such configurations, adjacent controllers 106 are likewise positioned so that their respective inter-module communication devices 108 maintain line-of-sight with an adjacent controller 106. In either configuration, in the event that physical building elements might block line-of-sight access to an adjacent module, optionally inexpensive cabling, such as optical fibers or other physical data communication connections, may be used as a bridge between such obstructed, adjacent lighting modules 100.

Figure 4:
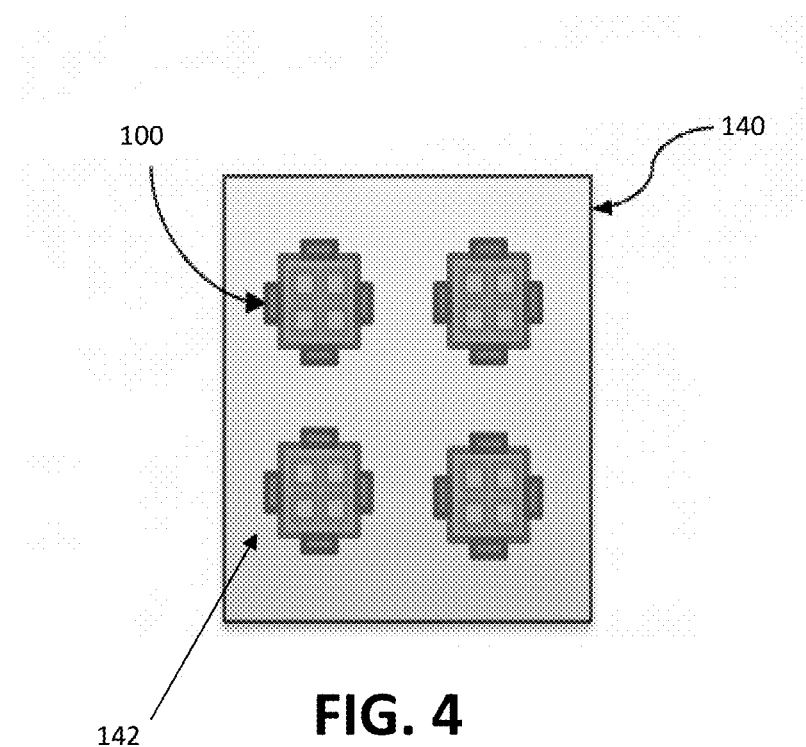
FIG. 4 is a schematic view of a group of lighting modules of FIGS. 3(a) and 3(b) installed on a ceiling tile.

FIG. 4 shows an exemplary configuration in accordance with certain aspects of an embodiment in which four lighting modules 100 are mounted to the bottom face of a standard ceiling tile 140 to form a VLC group 142, providing a suitable installation for both new buildings and retrofit installations. Moreover, and with reference to FIG. 5, multiple ceiling tiles 140 in a specified space within a building structure may each have VLC groups 142 of four lighting modules 100 mounted thereon, with all of the VLC groups 142 of lighting modules 100 within such specified space being communicatively chained together to allow data communication among all lighting modules 100 in such specified space, and thus defining a VLC chain 146. The specified space might comprise, by way of non-limiting example, a single room, a single hallway or selection of interconnected hallways, or such other segment of a building as may be desirable for a given installation. Likewise, adjacent specified spaces within a building may each have their own VLC chain 146, with adjacent VLC chains 146 likewise communicating with one another, either through communication devices 108, wired communication, or such other data communication as may be suitable to a particular installation.

Figure 5:
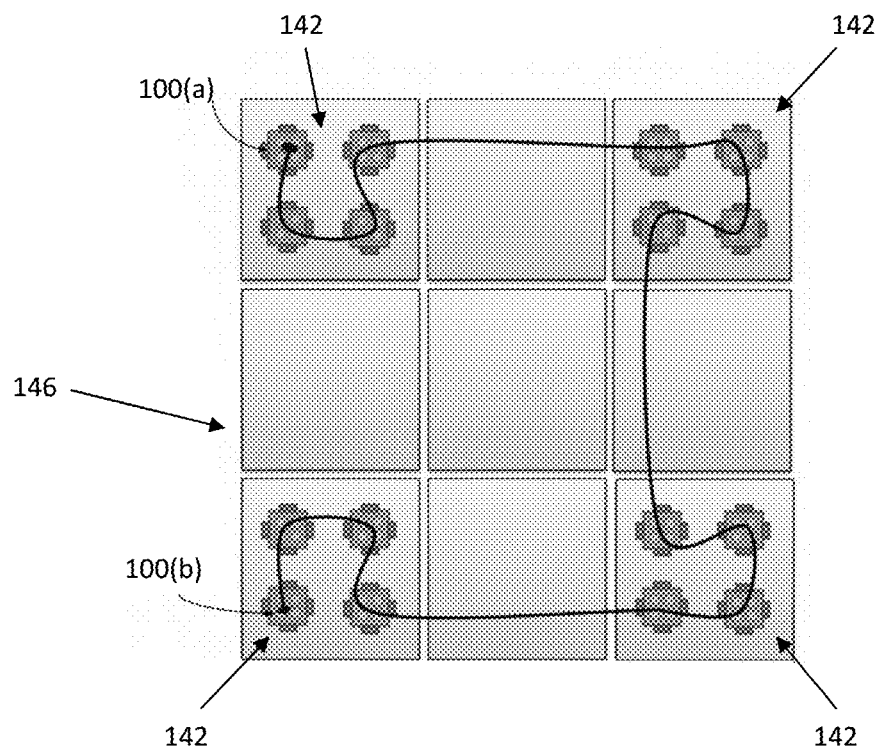
FIG. 5 is a schematic view of a chain of lighting modules of FIGS. 3(a) and 3(b) defining a visible light communication chain.

Each lighting module 100 is assigned a unique identification code. Similarly, each lighting module of a single VLC group 142 is assigned a unique group code for that VLC group 142. As shown in FIG. 5, VLC groups 142 of a VLC chain 146 are arranged for serial line-of-sight communication, with a first lighting module 100(a) being assigned the position of "head of chain," and a last lighting module 100(b) being assigned the position of "tail of chain." Such unique identification code, which may either be set as a factory setting or programmed by a system administrator, is transmitted to mobile receiver 200 through VLC so as to allow mobile receiver to identify each of those individual lighting modules 100 that are currently visible to mobile receiver 200.

In addition to defining unique identifiers for each lighting module, the system must also define a chain of communication through VLC chain 146, such that each lighting module 100 can generate and transmit its own unique signal at its own separate turn. To effect such individual and separate VLC transmission from the lighting modules 100 throughout a VLC chain 146, a commission step is first carried out to establish the order for signaling from the individual lighting modules 100 in that VLC chain 146. A virtual token (i.e., a communication data packet) is initialized at the lighting module 100(a) in the "head of chain" position to the starting group code (i.e., the assigned group code of the "head of chain" lighting module 100) and the unique identification code of the next lighting module 100 in the VLC chain 146, which may be designated by a system administrator. Such virtual token is then broadcasted by the "head of chain" lighting module 100(a), for example using all four of its inter-module communication devices 108. Upon receipt of the virtual token, the lighting module 100 whose unique identification code matches the identification code indicated in the virtual token then transmits, using VLC, its own unique identification code using bank 102 of LED's 104 associated with that particular lighting module 100, modifies the virtual token to reflect the next unique identification code in the VLC chain 146, and rebroadcasts the virtual token in the same manner as set forth above. This process is repeated until the "tail of chain" lighting module 100(b) receives the token, which then modifies the virtual token by setting the next identification code to the identification code of the previous module in the VLC chain 146, and toggles the direction of transmission to indicate that the virtual token will be travelling in the reverse direction. This sequence is then repeated when the virtual token arrives at "head of chain" lighting module 100(a) so as to cause the virtual token to continuously travel up and down the path of VLC chain 146. Through this method, the VLC transmitted by each lighting module 100 in the VLC chain 146 is time division multiplexed based on the location of the virtual token, such that at any time there is only one unique coded signal being send out from one lighting module 100 in the VLC chain 146, which in turn reduces packet collision at mobile receiver 200.

Figure 6:
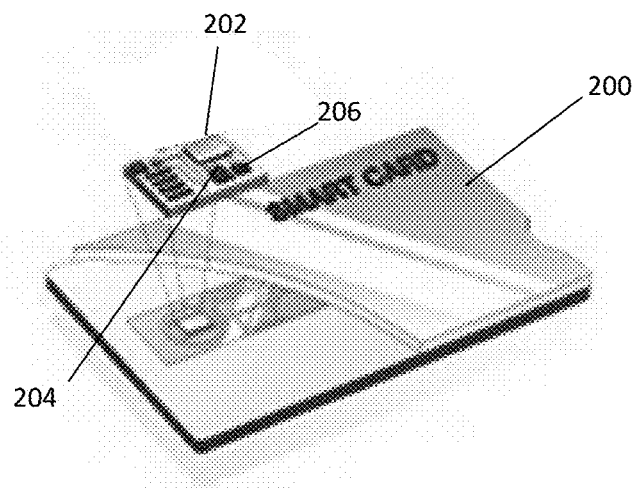
FIG. 6 is a schematic view of a mobile receiver for use with the system of FIG. 1.

Next, and as shown in the schematic view of FIG. 6, mobile receiver 200 may be provided in the form of a card that may be carried, by way of non-limiting example, as a badge, such as an employee's security or access badge. Each mobile receiver 200 preferably includes a photodetector 202, a microcontroller 204, and a mobile receiver communication device 206. Photodetector 202 may be of standard configuration and is able to detect a VLC data signal transmitted from a lighting module 100 within sight of such photodetector 202. Photodetector 202 may comprise a photodiode, as opposed to a CMOS receiver, offering significantly lower cost and easier implementation than previously known systems. Microcontroller 204 is provided computer code configured to receive such VLC data signal and to detect from such signal the unique identification codes of lighting modules 100 that are within sight of photodetector 202 at any given time, which obviously will change as the person or item carrying mobile receiver 200 moves. Finally, mobile receiver communication device 206 is configured to transmit such data to a processor, which processor may (using known triangulation techniques) determine the position of the mobile receiver based upon the specific lighting modules 100 that it sees at any given time. More particularly, through proper physical placement of lighting modules 100 in a space, the mobile receiver 200 may be assured of seeing transmissions from three or more lighting modules 100 at any one time (assuming of course that photodetector 202 is not covered). Mobile receiver 200 then rebroadcasts that data—i.e., data identifying those unique module identification codes that it received—to a processor for determination of the mobile receiver's location using triangulation to determine the union of all possible places the tag might be in order to be able to see all of the identified modules. A database containing the physical location of each lighting module 100 is maintained, and based upon the known physical location of each lighting module 100, the position of a mobile receiver 200 in sight of at least three of such lighting modules 100 may readily be calculated.

In a basic implementation, mobile receiver 200 may transmit such data through mobile receiver communication device 206 to a remote server. For instance, mobile receiver communication device may comprise a WiFi radio, which may communicate with such a remote server. In this configuration, the remote server receives the unique identification codes and, as discussed above, uses basic triangulation to determine the position of the mobile receiver 200.

Unfortunately, however, such WiFi transmission may represent undesirable RF leakage, even in those cases in which the transmission is encrypted. Thus, to provide additional data security, mobile receiver communication device 206 may alternatively transmit such data through mobile receiver communication device 206 to VLC chain 146, and more particularly to the nearest lighting module 100. In this configuration, both processing of such data to determine the physical location of mobile receiver 200, and storage of such location data, are carried out in a distributed computing environment comprised of interconnected controllers 106 of lighting modules 100 within the VLC chain 146, thus eliminating the need for a remote server. Also in this configuration, communication from mobile receiver 200 to controller 106 may be carried out by way of RF communication, WiFi communication, infrared, VLC, BLUETOOTH, ZIGBEE, or such other lower power data communication system currently available or as may become available in the future, with low power transmission configurations such as BLUETOOTH and ZIGBEE currently being preferred.

In the event that such processing is carried out in the distributed computing environment offered by lighting modules 100 themselves, a small computing device configuration, such as one using computing devices as simplistic as the popular RASPBERRY PI computing devices, could readily be configured by those skilled in the art to employ the processes set forth herein—namely, keeping track of the information received from one or more mobile receivers 200 and relevant information on lighting modules 100 in the VLC chain 146 (i.e., a database maintaining the physical location of each lighting module 100, associated unique identification codes, and VLC transmission sequence). That distributed computing system saves data indicating that a particular mobile receiver 200 was logged into a given location (i.e., a particular portion of a specified space in the building) within a particular time window, and would store such data for a user-designated period of time, and optionally periodically transmit such data to remote data storage, such as a cloud storage network or the like (with lighting modules 100 likewise serving as gateway devices to the cloud).

Using the collected data reflecting location of a mobile receiver 200, individuals may query such data in order to determine the location of the tagged person or items of interest at a particular time. In the server configuration discussed above, this may be easily implemented by a user simply connecting to the server, via their own computing device, to query the stored data. If the system is implemented in the distributed computing configuration in which the modules themselves process and store the data (which provides a much more secure scenario so that employee locations are not stored on a potentially accessible storage device), the intended querying device, such as a user's phone, may transmit the query to the physically closest lighting module 100 via, e.g., BLUETOOTH, RF, etc., and that closest module then sends out the query so that it propagates through all modules, to ultimately respond back to the user's phone. Preferably, each lighting module's response is appended so that a record may be maintained of the physical path the query took to locate the queried tag, and then route the response back through the most direct route to the user's phone.

Figure 7:
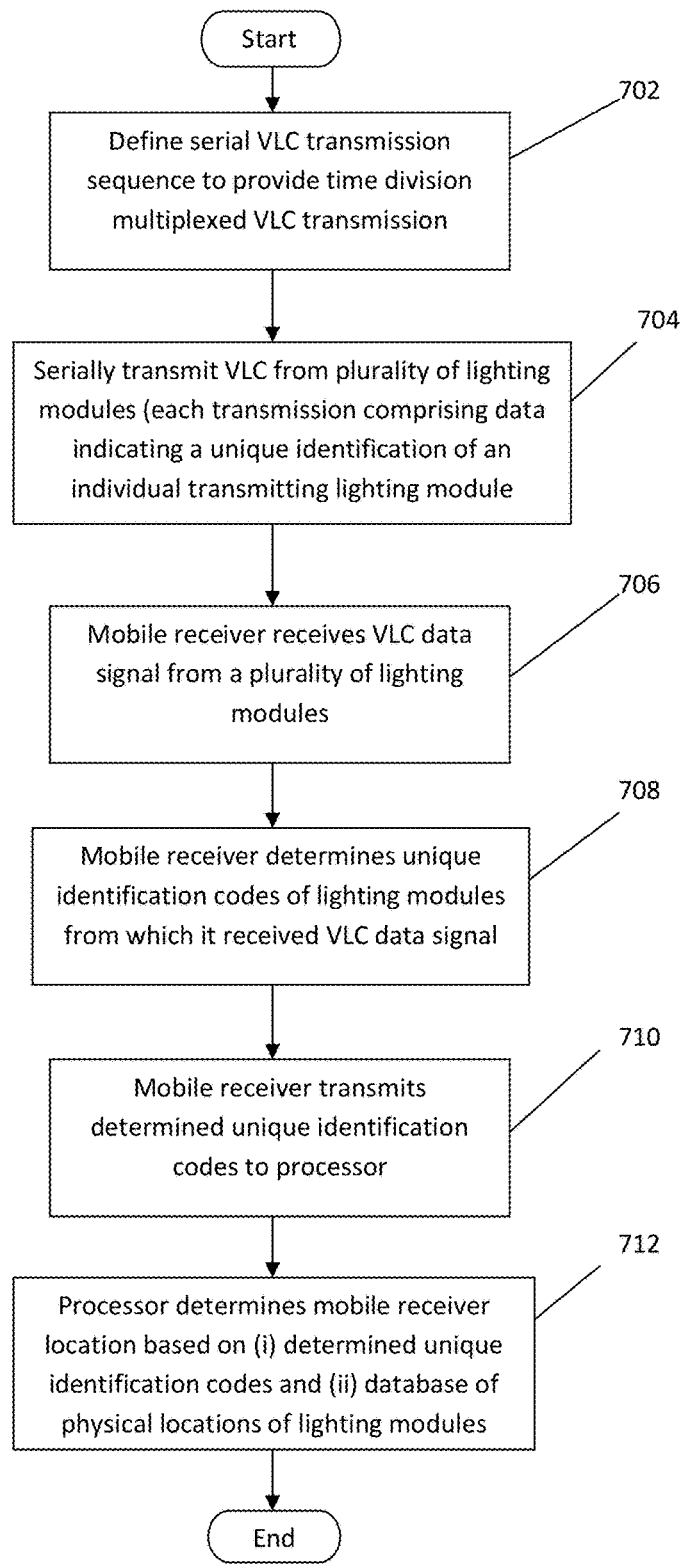
FIG. 7 represents an exemplary method in accordance with certain aspects of an embodiment of the invention.

FIG. 7 is a schematic view on an exemplary method that may be used to determine indoor positioning of a person or object in accordance with further aspects of an embodiment of the invention. At step 702, the system initiates commissioning of the lighting modules 100 in a VLC chain 146 to define the serial VLC transmission sequence of those lighting modules 100 so as to create a time division multiplexed VLC transmission. Next, at step 704, the system serially transmits VLC data messages from a plurality of lighting modules 100, in which each transmission comprises data indicating a unique identification code of an individual transmitting lighting module 100. Next, at step 706, a mobile receiver 200 receives the VLC data signal from a plurality of lighting modules 100. Next, at step 708, the mobile receiver 200 determines the unique identification codes of the lighting modules 100 from which it received VLC data signals. Next, at step 710, the mobile receiver 100 transmits the determined unique identification codes to a processor, which as discussed above may comprise a remote server or a distributed computing network comprised of VLC chain 146. Finally, at step 712, the processor determines the mobile receiver 100 location based on (i) the determined unique identification codes, and (ii) a database of physical locations of lighting modules 100.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A system for detecting a location of a mobile receiver in an indoor location, comprising:
   a plurality of lighting modules each having a light source configured to provide visible light communication data signals to a mobile receiver, wherein said plurality of lighting modules are in data communication with one another so as to serially transmit unique identification codes from the plurality of lighting modules using time division multiplexing, each lighting module further comprising a controller configured to receive a virtual token from a first adjacent lighting module, in response to receiving said virtual token cause said light source to transmit a unique identification code, and transmit said virtual token to a second adjacent lighting module;
   a mobile receiver having a photodetector and a transmitter, and computer code configured to determine lighting module identification codes from visible light signals transmitted from said plurality of lighting modules, and to transmit data representative of determined module identification codes to a processor; and
   a processor in data communication with said mobile receiver, said processor having computer executable code stored thereon configured to receive said data representative of determined module identification codes, and to determine a physical location of said mobile receiver based on said data representative of determined module identification codes and data representative of a physical location of said plurality of lighting modules.

2. The system of claim 1, wherein said light source further comprises an LED array positioned on a housing of each said lighting module.

3. The system of claim 1, each said lighting 1 module further comprising:
   a housing; and
   an inter-module communication device positioned on said housing.

4. The system of claim 3, where said inter-module communication device is positioned on said housing for line-of-sight communication with an adjacent one of said lighting modules.

5. The system of claim 4, wherein each said inter-module communication device further comprises an infrared LED and photodetector configured for transmission of data to and reception of data from an adjacent lighting module.

6. The system of claim 1, wherein each said lighting module is mounted to a ceiling tile in a building.

7. The system of claim 1, wherein said processor further comprises a distributed processor architecture implemented through multiple of said lighting modules.

8. The system of claim 1, wherein said mobile receiver further comprises a card-shaped badge configured for wearing by a human.

9. A method for detecting a location of a mobile receiver in an indoor location, comprising the steps of:
providing a plurality of lighting modules, each having a light source configured to provide visible light communication data signals to a mobile receiver, wherein said plurality of lighting modules are in data communication with one another so as to serially transmit unique identification codes from the plurality of lighting modules using time division multiplexing, each lighting module further comprising a controller configured to receive a virtual token from a first adjacent lighting module, in response to receiving said virtual token cause said light source to transmit a unique identification code, and transmit said virtual token to a second adjacent lighting module;
providing a mobile receiver having a photodetector and a transmitter, and computer code configured to determine lighting module identification codes from visible light signals transmitted from said plurality of lighting modules, and to transmit data representative of determined module identification codes to a processor;
providing a processor in data communication with said mobile receiver, said processor having computer executable code stored thereon configured to receive said data representative of determined module identification codes, and to determine a physical location of said mobile receiver based on said data representative of determined module identification codes and data representative of a physical location of said plurality of lighting modules;
serially transmitting visible light communication data signals from said plurality of modules;
receiving at said processor data transmissions from said mobile receiver comprising lighting module identification codes received by said mobile receiver from said lighting modules; and
determining at said processor a physical location of said mobile receiver.

10. The method of claim 9, wherein said light source further comprises an LED array positioned on a housing of each said lighting module.

11. The method of claim 9, wherein each said lighting module further comprises:
a housing; and
an inter-module communication device positioned on said housing.

12. The method of claim 11, wherein said inter-module communication device is positioned on said housing for line-of-sight communication with an adjacent one of said lighting modules.

13. The method of claim 12, wherein each said inter-module communication device further comprises an infrared LED and photodetector configured for transmission of data to and reception of data from an adjacent lighting module.

14. The method of claim 9, wherein each said lighting module is mounted to a ceiling tile in a building.

15. The method of claim 9, wherein said processor 1 further comprises a distributed processor architecture implemented through multiple of said lighting modules.

16. The method of claim 9, further comprising the steps of:
receiving at a controller of a first one of said lighting modules a virtual token from a second adjacent lighting module;
in response to receiving said virtual token, causing a light source of said second adjacent lighting module to transmit a unique identification code; and
transmitting said virtual token to a third adjacent lighting module.

17. The method of claim 9, wherein said mobile receiver further comprises a card-shaped badge configured for wearing by a human.

18. A method for detecting a location of a mobile receiver in an indoor location, comprising the steps of:
providing a plurality of lighting modules, each having a light source configured to provide visible light communication data signals to a mobile receiver, wherein said plurality of lighting modules are in data communication with one another so as to serially transmit unique identification codes from the plurality of lighting modules to a mobile receiver using time division multiplexing, each lighting module further comprising a controller configured to receive a virtual token from a first adjacent lighting module, in response to receiving said virtual token cause said light source to transmit a unique identification code, and transmit said virtual token to a second adjacent lighting module;
providing a processor configured for data communication with said mobile receiver, said processor having computer executable code stored thereon configured to receive from said mobile receiver data representative of module identification codes received by said mobile receiver, and to determine a physical location of said mobile receiver based on said data representative of determined module identification codes and data representative of a physical location of said plurality of lighting modules;
serially transmitting visible light communication data signals from said plurality of modules;
receiving at said processor data transmissions from said mobile receiver comprising lighting module identification codes received by said mobile receiver from said lighting modules; and
determining at said processor a physical location of said mobile receiver.

19. The method of claim 18, further comprising the steps of:
receiving at a controller of a first one of said lighting modules a virtual token from a second adjacent lighting module;
in response to receiving said virtual token, causing a light source of said second adjacent lighting module to transmit a unique identification code; and
transmitting said virtual token to a third adjacent lighting module.

* * * * *